United States Patent [19]
Yeh

[11] 4,118,285
[45] Oct. 3, 1978

[54] SEPARATION OF LIQUID MIXTURES

[75] Inventor: George Chiayou Yeh, Newtown Sq., Pa.

[73] Assignee: Villanova University, Villanova, Pa.

[21] Appl. No.: 572,881

[22] Filed: Apr. 29, 1975

[51] Int. Cl.² ............................................. B01D 3/14
[52] U.S. Cl. ........................................ 203/81; 203/86; 203/87; 261/113
[58] Field of Search .................. 203/39, 99, 89, 81, 203/86, 87; 202/197, 200, 158, 202, 236; 261/94, 99, 114, 113; 210/181, 182; 159/DIG. 27

[56] References Cited

U.S. PATENT DOCUMENTS

| | | | |
|---|---|---|---|
| 2,958,657 | 11/1960 | Binning et al. | 203/99 |
| 3,084,108 | 4/1963 | Randall | 202/158 |
| 3,225,524 | 12/1965 | Berrian | 159/DIG. 27 |
| 3,240,683 | 3/1966 | Rodgers | 159/DIG. 15 |
| 3,340,186 | 9/1967 | Weyl | 159/DIG. 27 |
| 3,367,787 | 2/1968 | Thijssen et al. | 159/DIG. 27 |
| 3,385,769 | 5/1968 | Brose | 159/DIG. 27 |
| 3,497,423 | 2/1970 | Rodgers | 159/DIG. 27 |
| 3,730,690 | 5/1973 | McCarthy et al. | 202/158 |
| 3,841,976 | 10/1974 | Scott et al. | 159/DIG. 27 |
| 3,887,665 | 6/1975 | Mix et al. | 202/158 |

*Primary Examiner*—Hiram H. Bernstein
*Attorney, Agent, or Firm*—James Albert Drobile

[57] ABSTRACT

Herein are disclosed an improved method and apparatus for separating a mixture of liquids of differing volatilities by fractional distillation in a plate-type apparatus. Plates consisting at least in part of a porous structure having capillary-type passages extending between openings on one side of the plate and openings on the other side of the plate are employed. The capillary-type passages are adapted to be wetted and filled at least in part by the liquid condensate resulting from the condensation of a vapor mixture, with the consequent formation of menisci in the capillary-type passages and the generation of capillary pressures that cause the condensed liquid to be lodged within the capillary-type passages and transmitted through the plate while preventing the passage of vapor. A vapor mixture produced by boiling the liquid mixture is brought into contact with one side of the plate containing capillary-type passages, where the vapor mixture is substantially condensed in and near the adjacent openings of such passages, and the condensed liquid is transmitted through the passages to the other side of the plate where it is boiled substantially in and adjacent to the openings of such passages. The capillary pressure differential required to cause the condensed liquid to flow is produced by the boiling of the condensed liquid, and the heat required for such boiling preferably is obtained at least in substantial part by conduction of the heat of condensation through the plate. One or more separation stages can be employed, and plate efficiencies (Murphree) of 100 per cent or more are obtainable.

13 Claims, 5 Drawing Figures

SEPARATION OF LIQUID MIXTURES

BACKGROUND OF THE INVENTION

1. Field of the Invention

The invention relates to the separation of liquid mixtures, including solutions. More particularly, it relates to the separation of a mixture of liquids of differing volatilities by stage-wise or fractional distillation. Specifically, the present invention is directed to an improved method and apparatus for separating a liquid mixture by fractional distillation in a plate-type apparatus employing at least one plate consisting at least in part of a porous structure having capillary-type passages which permit of the capillary suction flow of liquid but not of the passage of vapor.

2. Description of Prior Art

Methods and apparatus for separating mixtures of volatile liquids are well known in the art. One early technique, i.e., "multiple distillation", involved the use of a series of separate stills. Another conventional technique, namely, "rectification", is an outgrowth of "multiple distillation", and resembles multiple distillation in its object and result but not necessarily in the mechanism by which it achieves the result.

In rectification, there is a direct interchange of the heat of condensation and the heat of evaporation at each stage of a multiple-stage operation conducted in a single apparatus. That apparatus, called a rectifying column, consists of a vertical column connected at the bottom to the outlet of a still, and divided into vertically-disposed compartments by a plurality of transverse plates. These plates have openings, such as risers, perforations or the like, which permit of the passage of vapor ascending from below, and devices such as bubble caps or the like which attempt to bring such vapor into intimate contact with the liquid maintained to a finite level on the plate's top surface. Each plate also has an overflow pipe, or downcomer, which maintains the desired, finite level of the liquid on the plate, and discharges excess liquid into the pool of liquid similarly maintained on the plate below at a point below the surface of such pool. The pool of liquid on each plate is prevented from passing downwardly through the openings on the plate either by the risers or, in the case of a perforated plate, by the vapor which is coming up through those perforations from the compartment below.

Each of the plates in a rectifying column functions more or less like a small still, in which the source of the heat of vaporization is the hot vapor coming from the plate below, and the cooling medium is the cooler liquid coming from the plate above. In theory, optimum enrichment of the ascending vapor by the descending liquid is achieved when the molal ratio of such liquid to such vapor is practically unity. In actual practice, however, a ratio of less than unity is maintained in order to reduce heat consumption. Consequently, the rate of enrichment of the ascending vapor by the descending liquid typically is not as rapid as would be expected in equimolal countercurrent flow.

The analogy between a rectifying column and a series of separate stills does not hold if the vapor leaving the liquid on a plate is not in equilibrium with that liquid. In all conventional rectifying columns, it has been found that the vapor above each plate contains less of the more volatile component or components than would be the case if complete equilibrium had been reached. This departure from equilibrium between the rising bubbles of vapor and the surrounding liquid on a plate is the driving force for a molecular and turbulent transport of mass and heat between the vapor and the liquid, the rates of which transport processes vary directly with interfacial area, concentration and temperature differentials between the two phases, turbulence within the phases, and contacting time. The bubbling action in a conventional rectifying column also causes entrainment of liquid in the vapor, resulting in the back-mixing of the descending liquid coming from the plate above.

As is apparent from the above description, the rate and efficiency of liquid fractionation by conventional rectification are controlled by the mechanisms and rates of mass and heat transfer between the two fluid phases, and are limited by liquid entrainment. However, because of the complexity of the mechanisms of these two transfer processes, and the fact that, historically, rectification is an outgrowth of multiple distillation, in practice rectification has been regarded and treated as an equilibrium process rather than as a rate process. This attitude is reflected in the universal practice of determining the so-called "plate efficiency" for a conventional rectification plate in terms of the approach to equilibrium expressed as a fraction or per cent.

Since the turn of this century, many workers in the field have measured the plate efficiencies for various liquid systems, plate designs and operating conditions, and have attempted to improve plate efficiencies through changes in the geometrical design of the plates and in operating conditions. Plate efficiencies for known plate designs have varied widely from about 10 percent to about 90 percent, depending upon the liquid system, plate design and operating conditions. The average efficiency for plate designs commonly employed in conventional rectifying columns used in industry is less than 65 percent. No known plate design has been found to provide a plate efficiency of 100 percent.

In view of the above, a principal object of the present invention is to provide a novel liquid fractionation method and apparatus which avoid the difficulties normally associated with conventional rectification. In particular, it is an object of the present invention to provide a fractionation method and apparatus which permit of the elimination of vapor flow through the plates, and the consequent intermixing between the two fluid phases, which typically occur in conventional rectification.

Another and primary object of the present invention is to provide a novel method and apparatus for separating mixtures of volatile liquids by fractional distillation in accordance with a mechanism which is totally different from that of conventional rectification. Thus, it is an object of the present invention to provide a fractionation method and apparatus which employ plates having capillary-type passages adapted to effect condensation of vapor mixtures and transfer and subsequent equilibrium evaporation of the condensed liquid under the influence of capillary pressures.

A further object of the present invention is to provide a novel plate design for liquid fractionating columns, through the use of which extremely high efficiencies, even approaching or exceeding 100 percent, are obtained.

Another important object of the present invention is to provide a novel method and apparatus which are particularly effective for separating mixtures of liquids whose respective volatilities are relatively close.

A further object of the invention is to provide a novel fractionation apparatus whose operation characteristically involves an uncommonly low pressure drop.

Still another object of the invention is to provide a novel fractionation apparatus employing plates adapted to effect a rapid transfer of heat from the condensing vapor beneath the plate to the liquid above the plate, and rapid and equilibrium vaporization of the liquid on the plate through nucleate boiling over the surface of the plate.

SUMMARY OF THE INVENTION

In accordance with the present invention, a liquid mixture is rapidly and efficiently separated through the use of one or more capillary-type plates consisting or constructed at least in part of a porous structure having capillary-type passages extending between openings on one side of the plate and openings on the reverse side of the plate, which passages are adapted to effect capillary condensation of a vapor mixture derived from the liquid mixture in and adjacent to the openings on the one side, the transfer of the condensed liquid substantially by capillary suction flow to the openings on the reverse side, and capillary or nucleate boiling of the condensed liquid in and adjacent to the openings on the reverse side of the plate. Thus, in practice the equilibrium vapor mixture from the liquid mixture to be separated is first condensed on the near or condensation side of a first capillary-type plate, and the condensate so formed is then transported through the plate and is boiled on the far, or vaporization, side of the same plate utilizing the latent heat of condensation which preferably was transferred by conduction through the plate from the condensation side to the vaporization side of the plate. The vapor mixture removed from the vaporization side of the first plate then is condensed on the adjacent, condensation side of a second plate, with the resultant condensate again being transported through the second plate and boiled from the far, vaporization side of the second plate. Thus, a series of successive condensations and subsequent equilibrium vaporizations are carried out, employing a series of capillary-type plates to obtain the rapid and desired fractionation of a liquid mixture in a manner that appears similar to conventional rectification employing a conventional plate column, but which is totally different in mechanism and efficiency. Separation of a liquid mixture in accordance with the method and apparatus of the present invention hereinafter will be referred to as "capillary distillation".

As used herein, the term, "liquid mixture", means a mixture of two or more volatile liquids whose respective volatilities differ, and includes a mixture of more or less immiscible liquids as well as liquid solutions. By "capillary-type plate" is meant a distillation plate for use in the fractionation of liquid mixtures in accordance with the present invention, and which consists at least in part of a so-called porous structure. By "porous structure" is meant a rigid or semi-rigid structure containing a plurality of capillary-type passages extending between openings on one side of the structure and openings on another side of the structure. By "capillary-type passages" is meant capillaries, capillary-type tubes, or interconnecting openings or pores, adapted to effect capillary condensation of a vapor mixture derived from the liquid mixture, transport of the condensed liquid presumably by capillary suction flow, and capillary equilibrium vaporization or boiling of such liquid. Preferably, also, the so-called porous structure is adapted rapidly to transmit, from one side to the other, the heat released upon condensation of the vapor mixture.

In practice, the present invention involves separation of a liquid mixture through the use of at least one capillary-type plate in place of the bubble-cap tray or plate, or a variation thereof such as the valve tray, the uniflux tray, the sieve plate and the like, typically used in conventional vapor-dispersed distillation apparatus, or in place of the packing, such as regular and random packing, baffles, multibeam support plate and the like, typically used in conventional liquid-dispersed distillation apparatus. However, in contradistinction to conventional rectification techniques, capillary distillation utilizing capillary-type plates in accordance with the present invention is conducted without the passage of vapor through the capillary-type plate, so that the two fluid phases essentially are in contact only at the terminal menisci of the condensed liquid lodged within the capillary-type passages. The maintenance of this distinction requires that the pressure differential across the plate be maintained at a level which is less than the capillary pressure associated with the menisci.

In the practice of the present invention, any one or more of the following three general types of capillary-type plates may be employed: (Type I) a capillary-type plate in which the entire porous structure is adapted to be completely wetted by a condensed vapor mixture derived from the liquid mixture to be separated; (Type II) a capillary-type plate in which the porous structure is adapted to be wetted by such condensate on only one side (i.e., either the vaporization side or the condensation side), but not on the reverse side; and (Type III) a capillary-type plate in which the porous structure is not adapted to be wetted by such condensate on either the condensation side or the vaporization side, but is adapted to be wetted throughout its central portion. All three types necessarily are adapted to be wetted by the condensed vapor mixture throughout the interior of the porous structure, i.e., throughout the central wall surfaces of the capillary-type passages, resulting in the wetting of at least a partial thickness of the plate. A capillary-type plate answering to the description of either Type II or Type III is said to exhibit a dual wetting property. Needless to say, any combination of the above types of capillary-type plates may be employed in the same capillary distillation apparatus.

Alternatives contemplated by capillary distillation in accordance with the present invention include at least the following:

A. Choice and orientation of the capillary-type plate, e.g.:
  a. Use of one or more Type I capillary-type plates;
  b. Use of one or more Type II capillary-type plates, with vaporization taking place on the wettable side and condensation taking place on the non-wettable side;
  c. Use of one or more Type II capillary-type plates, with vaporization taking place on the non-wettable side and condensation taking place on the wettable side; and
  d. Use of one or more Type III capillary-type plates.

B. Choice of operating method, e.g.:
  a. Steady-state distillation with rectification; and
  b. Unsteady-state distillation without rectification.

With reference to the above alternatives, the wetting property and orientation of the porous structure of the capillary-type plate, and the presence or absence of rectification, will determine the shape (i.e., either concave or convex) and the number (i.e., either one or two in each capillary-type passage) of the liquid menisci. Accordingly, the mechanism and rates of both capillary condensation and capillary vaporization will depend to a degree upon the selected type and orientation of the capillary-type plate and upon the operating method. Thus, the capillary condensation may be rapid and non-equilibrium, or it may be slow and fractional. Similarly, the capillary vaporization may be rapid and non-equilibrium, or it may be slow and equilibrium in nature, dependent mainly upon the shape of the liquid menisci formed at the vapor-liquid interface, or interfaces, inside of the capillary-type passages.

The porous structure constituting an essential part of the capillary-type plate which is employed in the practice of the present invention can be fabricated from any material which provides the requisite capillary passages from one side of the plate to the reverse side, in such number, size, material and configuration that a vapor mixture derived from the liquid mixture to be separated can be condensed in and adjacent to the openings on the condensation side of the plate, the condensate so formed can wet and lodge inside of the capillary passages and be transported to the vaporization side of the plate, and the liquid condensate can be boiled in and adjacent to the openings on the vaporization side of the plate. Examples of commercially-available materials which are suitable for use in fabricating the porous structure of a capillary-type plate in accordance with the present invention are: (1) wettable materials, e.g.: sintered porous metal; fiber metal; metal cloth; wire mesh laminate; and the like; and (2) non-wettable materials, e.g.: porous plastic films and the like. A capillary-type plate whose porous structure is non-wettable on one or both of the condensation and vaporization sides (i.e., a Type II or Type III capillary-type plate, respectively) conveniently can be produced by bonding a layer of non-wettable substance to an otherwise wettable structure. For example, a microporous tetrafluoroethylene membrane 0.0005 inch thick can be bonded to one or both such sides of a sintered (powder) stainless steel plate. Such a bonded layer would have a mean pore size of several microns.

The condensed vapor mixture can accumulate not only within the capillary passages, but also on the vaporization side of the plate. Thus, the ascending vapor mixture condenses on and adjacent to the menisci of the liquid condensate contained within the capillary passages, and the latent heat of condensation is released and transferred both to the liquid within the capillary passages and to the liquid on the vaporization side of the plate, where such heat is utilized to effect vaporization of the liquid. As will be apparent, the thermal conductivity of the material which is employed in fabricating the porous structure of a capillary-type plate is as important as its wetting property. A capillary-type plate in accordance with the present invention can be fabricated effectively to prevent the passage of vapor through the plate and, consequently, the blowing of the vapor through the liquid pool on top of the plate, provided the pressure differential across the plate is maintained below the capillary pressure generated within the capillary-type passages of the plate. Accordingly, a plate efficiency of 100 per cent, computed in the conventional manner, theoretically is obtainable. Also, since there is no flowthrough of vapor, the pressure drop across the plate is minimal if not nil.

One or both sides of the porous structure of a capillary-type plate may be made, or may be treated, so as to be non-wettable to the liquid mixture in order to achieve the various desirable effects described above. A curved liquid-vapor interface, i.e., a meniscus, can be expected to produce an increase or a decrease in saturation vapor pressure, as well as in pressure differential, i.e., capillary pressure. This change in saturation vapor pressure has been expressed in the well-known Kelvin Equation, viz.:

$$\ln \frac{P}{P_o} = \frac{2\delta V}{RTr} \; ;$$

where $\gamma$ is the liquid-vapor interfacial tension, V is the molar volume of the liquid, R is the gas constant, T is the absolute temperature, $r$ is the radius of curvature of the liquid-vapor interface, i.e., meniscus, $P_o$ is the normal saturation vapor pressure, and P is the actual saturation vapor pressure on the liquid meniscus. For a liquid in a capillary passage defined by a wettable material, the saturation vapor pressure decreases. However, for a liquid in a capillary passage defined by a non-wettable material, the saturation vapor pressure increases. The Kelvin Equation has been found to apply well to relatively large capillaries. However, for extremely small and wettable capillaries, the present inventor as well as other workers (see, for example, Folman and Shereshefsky, Journal of Physical Chemistry, Volume 59, page 607 (1955)) have found that water and organic liquids such as toluene, in capillaries having radii of a few microns, exhibited saturation vapor pressure lowerings of from ten to eighty times those calculated with the Kelvin Equation. This phenomenon may be due to the fact that the two-dimensional molecular adhesive force between the liquid and the capillary wall surface in an extremely small capillary is far greater than the three-dimensional molecular cohesive force of the liquid. While not intended to be limited by any particular theory or theories of operating mechanism, this invention, i.e., capillary distillation, apparently utilizes such phenomena to achieve rapid yet equilibrium condensation and vaporization across a capillary-type plate under the influence of capillary pressure, with the result that extremely high plate efficiencies, unobtainable with conventional-type plates, are achieved.

The invention can be more fully understood by reference to the accompanying drawings and graphs.

BRIEF DESCRIPTION OF THE DRAWINGS

The accompanying drawings illustrate the method and apparatus of the present invention, and the results which are obtained through practice of the invention.

FIG. 1 illustrates, schematically, a single capillary distillation stage utilizing a capillary-type plate in accordance with the present invention, together with means for initially boiling the liquid mixture.

DETAILED DESCRIPTION OF INVENTION

The invention now will be described in detail, with reference to the accompanying figures.

Figure 1:
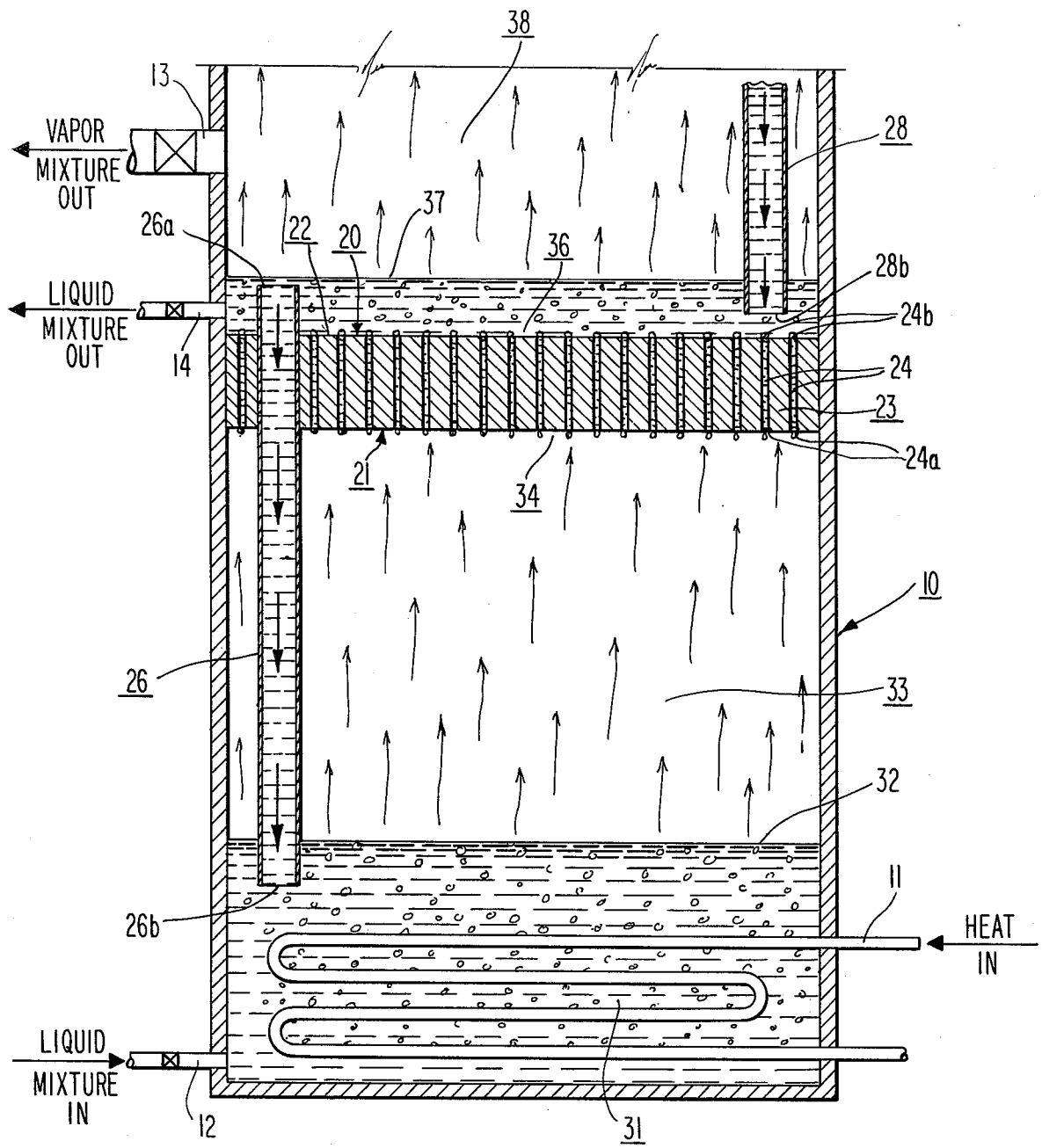
FIG. 1 is a schematic diagram, in cross-section, of a portion of an apparatus in accordance with the present invention. In particular.

As noted above, FIG. 1 schematically illustrates both the apparatus and the method of the present invention. In particular, FIG. 1 illustrates, schematically and in vertical cross-section, a single stage of a capillary distillation apparatus, together with the liquid mixture still, or boiler. Additional distillation stages, to the extent needed to carry out the desired separation, can be superimposed in series, one after the other, after the single stage shown. The configuration and structural details of the capillary-type plate shown in FIG. 1 are to some extent some-simplified and/or exaggerated for purposes of illustration, and that configuration and those details are not intended as limitations on the present invention.

Referring to FIG. 1, the capillary distillation apparatus is comprised of closed and vertically-elongated vessel 10 equipped with inlet port 12 for the liquid mixture to be separated, with outlet port 14 for the optional withdrawal of the liquid mixture removed from adjacent the second, or vaporization, side of the capillary distillation stage, and with outlet port 13 for the optional withdrawal of the vapor mixture removed from adjacent the second, or vaporization, side of the capillary distillation stage. Means also are provided (shown in FIG. 1 as heating coil 11) for introducing heat into boiling zone 31. Vessel 10 is shown as equipped with a single capillary-type plate 20, which is mounted transversely and generally horizontally in vessel 10, and which divides the interior of vessel 10 into separate compartments. Capillary-type plate 20 has a first, or condensation, side 21, and a second, or vaporization, side 22. Capillary-type plate 20 consists in substantial part of a porous structure 23 having capillary-type passages 24 extending between openings 24a on the condensation side of the plate and openings 24b on the vaporization side of the plate. (While capillary-type passages 24 are shown as straight, vertical passages of uniform width throughout, this has been done for purposes of illustration, and without any intention to be limited thereby.) Capillary-type plate 20 also includes bulk flow conduit, or downcomer 26, which serves to maintain a finite level of liquid on the vaporization side 22 of plate 20, and to transmit the overflow of liquid mixture from adjacent vaporization side 22 through inlet port 26a to a discharge port 26b located adjacent and opposite condensation side 21 of capillary-type plate 20. FIG. 1 also shows another bulk flow conduit, or downcomer 28, which is a part of a second capillary-type plate (not shown) which would be present if a second capillary distillation stage were to be employed. Conduit 28 discharges through port 28b at a point below level 37 of the liquid pool maintained on vaporization side 22 of capillary-type plate 20, and serves the same function with respect to a second capillary distillation stage (not shown) as conduit 26 serves with respect to the first such stage.

The method of the present invention will now be described, again with reference to FIG. 1. As shown in FIG. 1, a liquid mixture comprising components of differing volatilities is introduced through inlet port 12 to vessel 10, where it is subjected to boiling in the boiling zone 31 by means of heat introduced through heat means 11 to produce a vapor mixture containing a higher concentration of the more volatile component or components relative to the less volatile component or components than in the liquid mixture. According to the practice of the method of the present invention, this vapor mixture is conducted through vapor zone 33 and is brought into contact with the first, or condensation, side 21 of capillary-type plate 20, where the vapor mixture is condensed at least in part and substantially in and adjacent to openings 24a of capillary-type passages 24 in porous structure 23, thus tending to lodge in and fill those openings. The liquid condensate then is caused to flow, substantially by capillary suction flow when the vaporization of the condensed liquid occurs on the vaporization side 22 of plate 20, from openings 24a on condensation side 21 of plate 20, to openings 24b on vaporization side 22 of plate 20, where it is subjected to continuous boiling.

In a preferred embodiment of the invention, the porous structure 23 of capillary-type plate 20 is fabricated from a heat-conductive material, so that the heat of condensation released by condensation of the vapor mixture in condensation zone 34 near openings 24a of plate 20 is conducted rapidly through porous structure 23 of plate 20 to vaporization side 22 of plate 20, where such heat is utilized, as all or part of the heat of vaporization, in the boiling of liquid in vaporization zone 36 near openings 24b. The temperature gradient causing the flow of heat from side 21 to side 22 of plate 20 is produced substantially by the cooling effect of the vaporization in vaporization zone 36 and the heating effect of condensation in condensation zone 34, although alternative methods may be employed. In the event that the porous structure 23 which constitutes a part of capillary-type plate 20 is not fabricated from a heat-conductive material, cooling means for assisting the heat removal from adjacent condensation side 21 of plate 20 may be employed, in order to cause and promote the condensation of vapor mixture in condensation zone 34. Likewise, under such circumstances heating means for assisting the heat addition to vaporization side 22 of plate 20 may be provided, in order to cause and promote the vaporization of liquid in vaporization zone 36.

In accordance with a preferred embodiment of the invention, a pool or layer of liquid is maintained, to a finite and predetermined level, on the vaporization side 22 of capillary-type plate 20. The presence of this pool of liquid serves to absorb heat, thus promoting the flow of heat by conduction through porous structure 23 from condensation side 21 to vaporization side 22. This pool of liquid is maintained at the desired level by means of the location of the inlet port 26a of the downcomer 26 in relation to the location of the vaporization side 22 of plate 20. The liquid condensate in and adjacent to openings 24b on vaporization side 22 of capillary-type plate 20 is subjected to equilibrium boiling, as described, to produce a substantially-equilibrium vapor mixture containing a higher concentration of the more volatile component or components relative to the less volatile component or components than in the vapor mixture which was condensed in zone 34 on condensation side 21 of the capillary-type plate 20. In FIG. 1, this vapor mixture is shown as being removed from adjacent vaporization side 22 of capillary-type plate 20, through the pool of liquid maintained on vaporization side 22 to the level 37 of that pool, where the vapor mixture emerges from the liquid and continues to ascend through vapor zone 38.

In the practice of the method of the present invention in its most basic form, i.e., with only one capillary distillation stage, the vapor mixture containing a higher concentration of the more volatile component or components relative to the less volatile component or components is removed as through discharge port 13 in FIG. 1, and the liquid mixture containing a lower concentration of the more volatile component or components relative to the less volatile component or components is removed as through discharge port 14 in FIG. 1. Depending upon the degree of separation required, additional capillary distillation stages may be employed in series, each such stage being substantially as described above with reference to a single stage. However, when a plurality of capillary distillation stages is employed, the downcomer transmitting liquid from the next succeeding stage must discharge at a point below the level of the liquid pool maintained on each stage. This is necessary in order to prevent the vapor mixture from passing up through the downcomer, thus by-passing the succeeding capillary distillation stage. For example, in FIG. 1, where the second capillary distillation stage is not shown except for a part of its downcomer 28, the dischage port 28b of that downcomer 28 is shown as discharging liquid below level 37 of the liquid pool maintained on vaporization side 22 of capillary-type plate 20.

In order to illustrate a specific embodiment of the present invention, an experimental capillary distillation apparatus was assembled utilizing a 1,000 milliliter, three-necked flask as the still or boiler, a column connected to the top of the flask and consisting of two 2-inch by 1-inch reducing sections of glass pipe with their enlarged ends joined together to provide the mounting for the capillary-type plate, and a constant reflux distilling head mounted vertically on top of the column. The distilling head could be operated at either total or partial reflux. Downcomers were constructed from ¼ inch glass tubing, with the downcomer from the condenser of the distilling head to the capillary-type plate being flared at one end to funnel the reflux condensate and constricted at the other end to minimize the entrance of vapor. The downcomer leading from adjacent the upper surface of the capillary-type plate to the distilling flask was similarly constricted at its lower end. This latter downcomer was passed through a ¼ inch hole drilled in the center of the capillary-type plate, and was sealed in that position by means of cement.

The flask serving as the still or boiler was heated by two external electrical heating mantles connected to a variable transformer. In addition, the column was wrapped first with fiberglass insulation and then with a heating tape. The current supplied to the heating tape was controlled by another variable transformer.

The capillary-type plate employed had a diameter of 2 ⅜ inches. An annular area of 5/16 inch in width around the outside edge of the capillary-type plate was made to be non-porous, thus leaving a central porous structure in the shape of a circle 2 inches in diameter. The porous structure was completely wettable (i.e., Type I), and was fabricated from sintered (powder) stainless steel plate of 1/16 inch thickness which is commercially available.

A hypodermic needle was employed to sample the liquid on the capillary-type plate when the liquid layer was kept to a level of less than 1 inch. This needle was mounted in the gasket at the central juncture of the two column sections, and was cemented in place. For liquid levels of 1 inch or more above the capillary-type plate, and for sampling the reflux condensate and the liquid in the flask, a longer sampling probe made from a plastic capillary tube was used. The use of the hypodermic needle made it convenient to attach syringes for the purpose of withdrawing samples when needed.

Temperatures were monitored by means of thermacouples positioned in the condenser of the distilling head, on the capillary-type plate, in the distilling flask, and on the outer wall of the column.

The pressure differential across the capillary-type plate was measured on a manometer with one leg connected to the distilling flask and the other leg open to the atmosphere. A capillary glass tubing was inserted in the line to eliminate the flow of vapors into the manometer. The pressure above the capillary-type plate was maintained at atmospheric pressure.

The above-described experimental capillary distillation apparatus was employed to separate liquid mixtures of various organic compounds. Each such distillation run was conducted in accordance with the following procedure:

(1) The height of the liquid pool on the capillary-type plate was established by adjusting the elevation of the inlet port of the downcomer leading from the plate;

(2) A sample probe was positioned adjacent the inlet port of the downcomer leading from the capillary-type plate;

(3) The distilling flask, or still, was filled with the liquid mixture to be separated, so that the level of the liquid mixture in the flask was 1 inch above the discharge port of the downcomer leading from the capillary-type plate and into the boiling mixture;

(4) One hour was allowed for the column to attain steady-state conditions in each run;

(5) The column heater was adjusted so that the temperature on the outer wall of the column was substantially identical to the temperature of the flux, which latter temperature was controlled by adjusting the rate of the cooling water in the condenser;

(6) A clean syringe was usd to take each sample of 0.2 milliliter, after 0.5 milliliter of the liquid had been withdrawn and discarded from each sampling port;

(7) Each sample was analyzed immediately after withdrawal;

(8) Temperatures and pressures were read for every sample taken, and sampling for each run was repeated at least five times in order to confirm the results;

(9) The vapor rate was determined by measuring the rate of condensation in the condenser of the distilling head when the constant reflux head was set at any one position. The vapor rate was varied by varying the heat input using a variable transformer, as described above; and

(10) The so-called Murphree plate efficiencies based on vapor compositions were calculated using the following relationship:

$$E = \frac{y_n - y_{(n+1)}}{y_n^* - y_{(n+1)}},$$

where E is the Murphree plate efficiency, $y_{n+1}$ is the concentration of the more volatile component in the vapor mixture coming to the plate, $y_n$ is the concentration of the same component in the vapor mixture leaving the plate, and $y_n^*$ is the concentration of the same component in the vapor mixture leaving the plate which would have been obtained if the vapor leaving the plate had been in equilibrium with the liquid on the plate, using average vapor compositions.

The experimental results of distillation runs carried out in the above-described experimental capillary distillation apparatus, and in accordance with the above-described procedure, with a binary liquid mixture consisting of ethylenedichloride and acetonitrile, in a concentration range of from 19 to 36 mole percent acetonitrile, where liquid and vapor compositions have the widest differences, are set forth in FIGS. 2, 3, 4 and 5, and are discussed hereinafter. These results include runs where the level of the liquid pool above the capillary-type plate was maintained variously at 0 inch, at ¼ inch, at ½ inch, at 1 inch, and at 2 inches.

Figure 2:
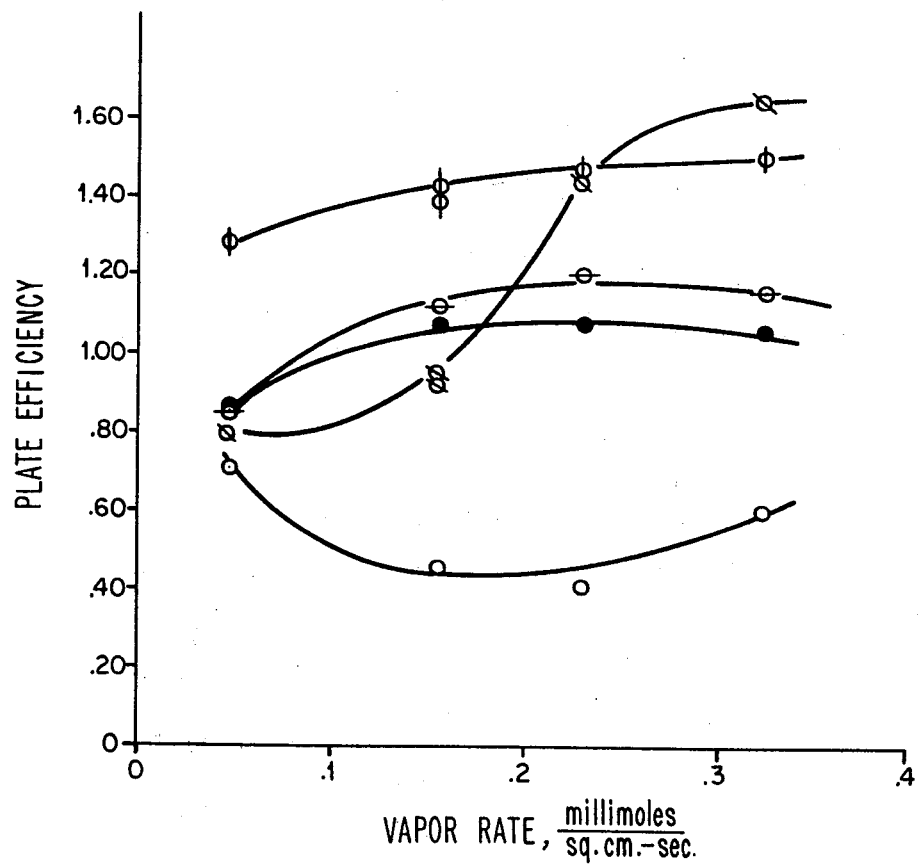
FIG. 2 is a graph showing the correlation between plate efficiency and vapor rate which was observed in the practice of an experimental embodiment of the method and apparatus of the invention.
Figure 3:
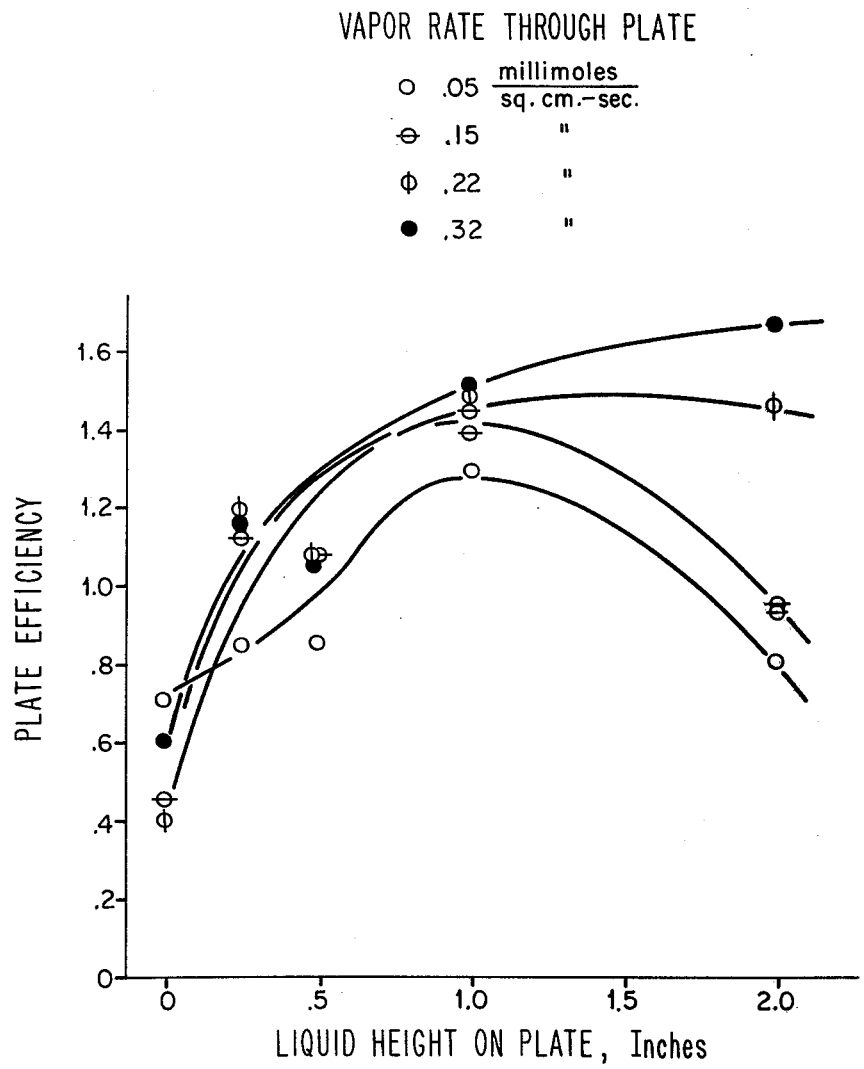
FIG. 3 is a graph showing the correlation between plate efficiency and the height of the liquid pool maintained on the capillary-type plate which was observed with the same experimental embodiment.

In FIG. 2, plate efficiency is shown as a function of the vapor rate for the various liquid levels. In FIG. 3, the same data are presented to show the plate efficiency as a function of liquid height on the plate for various vapor rates. As will be noted, the observed plate efficiencies generally were much higher than those typically achieved with conventional perforated or sieve plates. In addition, the plate efficiencies for the system tested were found generally to increase with the height of the liquid pool above the plate, but only up to a liquid level of about 1 inch. For liquid levels over 1 inch in height, the plate efficiency decreased with the lower vapor rates. It may be speculated that the height of the liquid pool above a capillary-type plate has two counteracting effects. Thus, on the one hand, it beneficially may provide additional enrichment of the generated vapor. On the other hand, it undesirably tends to suppress suction nucleate boiling of the liquid in and adjacent to the openings of the capillary-type passages. This may account for the apparent optimum liquid height suggested by the data presented in FIG. 3.

It is important to note that the plate efficiencies observed when no liquid pool was maintained on the capillary-type plate (i.e., at 0 inch liquid height) ranged between about 40 and about 70 percent. This observed fact constitutes clear evidence that the vapor mixture actually condensed and lodged in the porous structure of the capillary-type plate, with the consequent enrichment of that vapor through the capillary distillation mechanism hereinabove described. With a conventional sieve plate under such circumstances, i.e., in the absence of any liquid pool on the plate, the plate efficiency would have been zero since no enrichment of the vapor passing such a plate would be expected in the absence of a liquid pool on its top surface.

As will be noted in FIG. 2, the observed plate efficiencies appear to be unaffected by varying the vapor rate at liquid levels of 1 inch and lower, at least until the onset of flooding due to excessive vaporization when the liquid is overly heated. The superficial vapor velocities for the capillary-type plate employed were lower than those commonly experienced with conventional sieve or bubble-cap plates. However, the allowable maximum vapor velocity for a capillary-type plate can be increased either by increasing the porosity and/or thermal conductivity of the plate, or by reducing the thickness of the plate.

Figure 4:
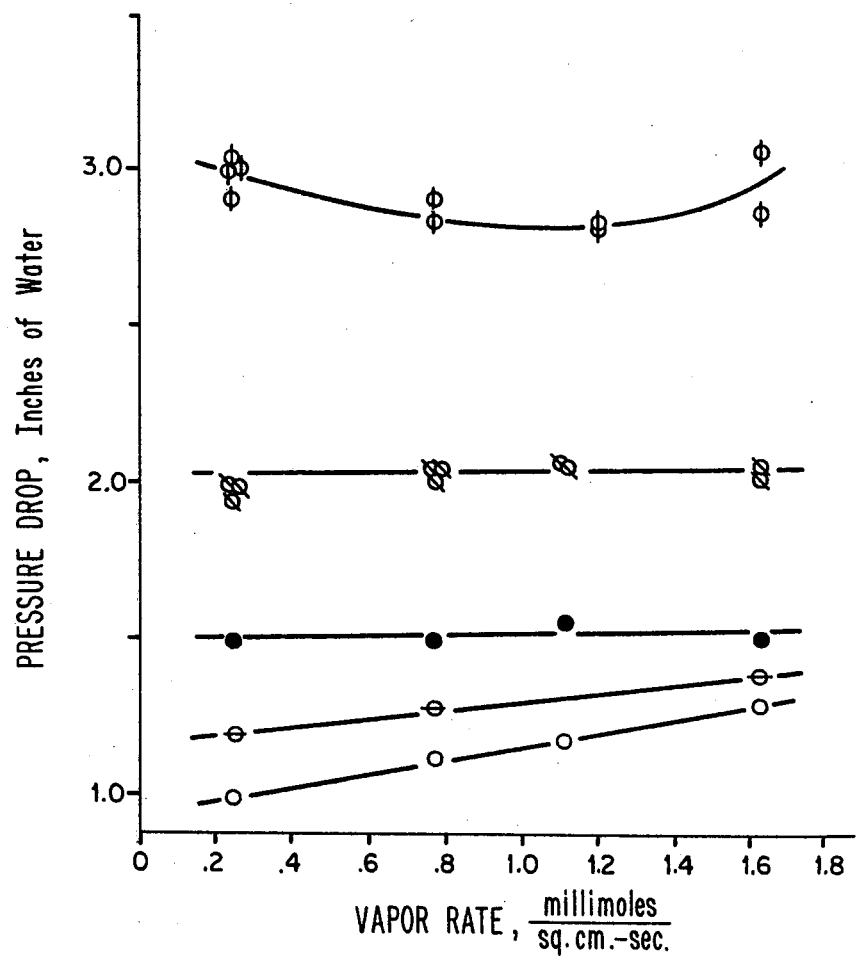
FIG. 4 is a graph showing the correlation between vapor rate and pressure drop across the capillary-type plate which was observed with the same experimental embodiment.
Figure 5:
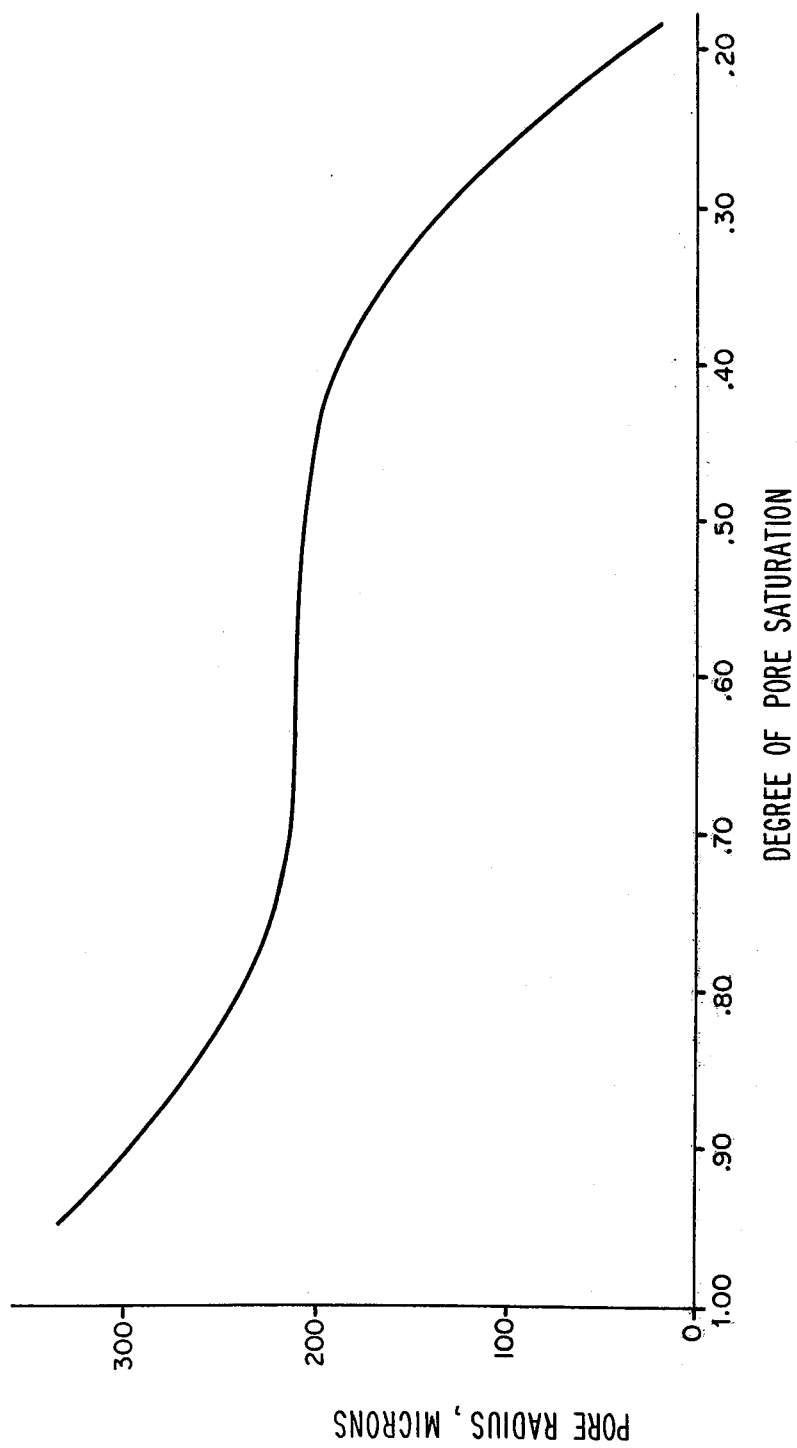
FIG. 5 is a graph showing the pore-size distribution in the capillary-type plate employed in the same experimental embodiment.

In FIG. 4, the pressure drop across the capillary-type plate is shown as a function of vapor rate for the various liquid heights. As might be expected, the pressure drop was found to increse with the height of the liquid pool above the capillary-type plate, but to be relatively independent of the vapor rate.

In principle, there should be little or no pressure drop across a capillary-type plate which is completely wetted by the condensed liquid, but has no liquid pool on its top, unless there is heat loss to the surroundings or vapor blowing through the plate. Since the pressure differential data reported in FIG. 4 represent a capillary-type plate which was completely wettable, a part of the observed pressure drop must be due to the static pressure of the liquid above the plate that the vapor must withstand. The remaining increment of the pressure drop may be attributed only to heat loss and the possible blowing of vapor mixture through large capillary-type passages or pores in the plate. Since a capillary pressure of 1 inch water corresponds to a pore radius of 220 microns, an operating pressure drop of 2 inches of water at a liquid level of 1 inch, as shown in FIG. 4, would indicate that some vapor blow-through of the capillary-type plate could have been occurring through pores larger than 220 microns in radius, assuming negligible heat loss to the surroundings. From the poresize distribution curve of FIG. 5, it can be seen that about 50 percent by volume of the pores in the capillary-type plate employed in the experimental runs were larger than 200 microns in radius. Accordingly, it may be concluded that in the capillary-type plate employed, both the capillary distillation mechanism and the conventional sieve plate distillation mechanism contributed to the observed efficiencies on an approximately equal basis. Needless to say, a capillary-type plate readily can be constructed, for example, from porous sintered metal plate, fiber metal or metal cloth, so as to have a pore-size distribution of any desired profile. Thus, in accordance with the present invention it is possible and practical to control the relative contributions of the two mechanisms, i.e., the capillary distillation mechanism and the conventional sieve distillation mechanism, to any desired extent. The capillary-type plate employed in the experimental runs described above provides an excellent example of such a practice.

As noted above with reference to FIGS. 2 and 3, the observed plate efficiencies for the experimental capillary-type plate employed were much higher, frequently even in excess of 100 percent, than those commonly experienced with conventional plates. Theoretically, the maximum attainable plate efficiency for the conventional distillation plate should be 100 percent, assuming complete mixing of the vapor with the liquid on the plate, and equilibrium vaporization and condensation. There are a number of factors which might account for plate efficiencies in excess of 100 percent with capillary distillation. Some of these important factors may be:

(1) More volatile components usually exhibit lower surface tensions, and, consequently, preferential and fractional condensation of the more volatile component may occur in the capillary-type passages, resulting in additional separation effects;

(2) In capillary distillation suction nucleate boiling of the liquid mixture on the vaporization side of the plate occurs in and adjacent to the openings of the capillary-type passages, where the condensate of the more volatile components may concentrate as a result of the capillary suction flow of the condensate formed within the capillary-type passages. This plug-flow of the liquid condensate through the capillary-type passages can result in unusually high plate efficiencies, as may be seen, since the boiling is not occurring from the bulk of the liquid above the plate;

(3) All or a substantial part of the required latent heat of vaporization is supplied rapidly by direct conduction of the latent heat of condensation across a preferably thin and highly-conductive capillary-type plate; furthermore, no heat is lost due to vapor blow-through such as commonly occurs in conventional rectifying columns;

(4) Capillary condensation on a concave (downward) meniscus, as described above, is enhanced by the capillary pressure exerted on the meniscus;

(5) The suction nucleate boiling of the liquid mixture which occurs in and adjacent to the openings of the capillary-type passages (as mentioned in (2), above) is capillary vaporization under the influence of capillary suction pressure; and (6) It is entirely conceivable that the condensed liquid lodged in the capillary-type passages may entrap vapor bubbles to form more than two menisci within an individual passage. As a result, successive condensations and vaporizations may occur at these menisci in individual capillary-type passages across the thickness of a particular capillary-type plate, thus producing a separation efficiency equivalent to that of several theoretical plates.

While one or more of the above-described phenomena may be contributing factors accounting for the extremely rapid and highly efficient separation of liquid mixtures experienced in the practice of the present invention, there is no intention that the present invention be limited in any way by those or other theories concerning its operation and results.

In accordance with the present invention, the porous structure of the capillary-type plate may be so constructed as to have variations in the width of the capillary-type passages from one side of the plate to the other, or may be constructed with any desired pore size distribution. Even when a very large capillary-type plate is required, little in the way of structural reinforcement will be required since th liquid height above the capillary-type plate, and the pressure drop across the capillary-type plate, are always very small in comparison to the conventional rectifying plate. Consequently, the total height of a distillation column adapted to practice capillary distillation will be small in comparison to the height of a conventional rectification column. Furthermore, the costs of constructing, operating and maintaining a capillary distillation column should be much smaller than those experienced with the conventional rectification column. As noted above, a further important advantage of capillary distillation is the avoidance of certain other difficulties due to the relatively large plate pressure drops typically associated with conventional rectifying columns. Additionally, a capillary distillation column would not be required to withstand the pressures and weights that normally are associated with conventional type columns. The relatively low operating pressures of a capillary distillation column also should facilitate the separation of heat-sensitive materials because of the absence of any substantial boiling point elevation due to high operating pressures.

In principle, the plate efficiency obtainable with capillary distillation should increase as the size of the capillary-type passages becomes smaller, and should increase as the capillary-type plate is made thinner and more porous. In order to provide sufficient cooling effect for condensation of the ascending vapor mixture, a minimum height of liquid above the capillary-type plate will be required. Above this minimum, further increases in the height of the liquid pool appear to have no significant beneficial effect, as already discussed. Finally, the vapor rate may be increased as much as is desired, either by using a highly-conductive, thin and very porous capillary-type plate, or by increasing the heating and cooling rates simultaneously.

Since vapor blow-through is either prevented or completely controlled in capillary distillation, the problems of liquid-entrainment and flooding which commonly are encountered with conventional rectifying columns are prevented or controlled, as may be obvious.

Another unique feature of capillary distillation is its ability to condense a vapor mixture at a liquid temperature higher than the normal dew-point of the mixture, due to the lower saturation vapor-pressure required on a concave meniscus. This feature enhances not only the condensation of the vapor mixture, but also the thermal conduction of the latent heat of condensation across the capillary-type plate. Similarly, the suction nucleate boiling (or capillary vaporization) occurring in and adjacent to the openings of the capillary-type passages can occur at a liquid temperature lower than the normal boiling point of the liquid condensate. This is for the reason that a liquid boils more readily from the surface of a porous solid, a phenomenon often referred to by chemists as the "boiling stone" effect. All of the foregoing features contribute to the superiority of capillary distillation over conventional rectification with respect to heat transfer and phase change. Such features are, in effect, similar to those provided by vacuum or molecular distillation.

Needless to say, liquid mixtures containing more than two components may be separated by capillary distillation in accordance with the present invention. Furthermore, one or more other substances may be added to the liquid mixture to be separated, in order to alter the vapor-liquid equilibria and/or relative volatility and thus facilitate the separation much in the manner of extractive distillation, azeotropic distillation, or the like.

It also is apparent that the operating pressure of a capillary distillation apparatus may be maintained at a level below atmospheric if desired, as commonly practiced in vacuum distillation and molecular distillation.

It further will be well understood by those skilled in the art of distillation that a distillation apparatus also may be employed as a chemical reactor to carry out various reactions in fluid phase simultaneously with the distillation operation.

A capillary-type plate in accordance with the present invention may be constructed in a form other than a flat plate, in order to provide more contacting area between the rising vapor mixture and the liquid mixture in and above the porous structure of the plate. Various means for controlling the flow of fluid, such as baffling devices, plate depressions instead of downcomers, sloped plates, valves, multi-liquid flow-paths, and the like, also may be used. Similarly, means for introducing various forms of energy, such as pressure waves, electro-magnetic fields, and the like, also may be provided in capillary distillation apparatus by application of the same techniques that are employed with conventional rectification apparatus.

It also is well understood that a distillation apparatus with rectification can be employed as a vapor-liquid contactor. Accordingly, a capillary distillation apparatus employing a capillary-type plate may be employed for improving interfacial mass transfer in any stage-wise vapor-liquid contacting operation such as absorption, humidification, and the like.

It should be understood that the present invention is applicable to the fractional distillation of liquid mixtures of all types, and to vapor-liquid contacting operations of all types, in which the condensation of vapor and the evaporation of liquid are influenced by the capillary forces produced within a porous structure placed between the two phases in a stage-wise contactor. Accordingly, the scope of this invention is not to be construed as limited in any way by the within disclosure with respect to the material and geometry of the porous structure, the number of stages employed, or the operating conditions employed.

The invention claimed is:

1. Method for separating a mixture of at least two liquids of differing volatilities, said method comprising:
   A. Boiling said liquid mixture to form a vapor mixture comprising a more volatile component and a less volatile component;
   B. Subjecting said vapor mixture to contact under condensing conditions with a first side of a porous structure having passages extending between openings on said first side and openings on a second side of said structure, said passages being adapted to permit said vapor mixture in condensed liquid state to flow therethrough substantially by capillary suction flow, whereby said vapor mixture is condensed at least in part and substantially in and adjacent to the openings on said first side and is caused to flow in condensed liquid state and substantially in the absence of vapor from the openings on said first side to the openings on said second side;
   C. Maintaining conditions of temperature and pressure adjacent said second side of said porous structure, whereby the liquid condensate of said vapor mixture in and adjacent to the openings of said passages on said second side is caused to boil and additional said liquid condensate is transferred substantially by capillary suction flow through said passages from the openings on said first side to the openings on said second side;
   D. Removing from adjacent said second side a vapor mixture containing a higher concentration of said more volatile component relative to said less volatile component than in the vapor mixture contacting said first side; and
   E. Removing from adjacent said second side a liquid mixture containing a lower concentration of said more volatile component relative to said less volatile component than in the vapor mixture contacting said first side.

2. Method according to claim 1, wherein said porous structure is fabricated from a heat-conductive material, and the heat produced by condensation of said vapor mixture is transmitted substantially by conduction through said porous structure from said first side to said second side and is utilized substantially to boil the liquid in and adjacent to the openings on said second side.

3. Method according to claim 1, wherein at least one of said sides of said porous structure is adapted to be wetted by said liquid mixture and its components.

4. Method according to claim 1, wherein at least one of said sides of said porous structure is adapted not to be wetted by said liquid mixture and its component.

5. Method according to claim 1, wherein said porous structure is fabricated from a sintered powdered material.

6. Method according to claim 1, wherein said porous structure is fabricated from a fibrous material.

7. Method according to claim 1, wherein said porous structure is fabricated from packed finely-divided material.

8. Method according to claim 1, wherein said porous structure is fabricated from wire mesh laminate.

9. Method according to claim 1, wherein a layer of liquid mixture is maintained on the surface of said second side.

10. Method according to claim 1, wherein said porous structure also contains openings adapted in size, shape and number to permit the vapor mixture contacting said first side in part to flow through said structure in vapor state from said first side to said second side.

11. Method according to claim 1, wherein the steps designated (A), (B), (C), (D) and (E) are conducted in a continuous manner.

12. Method according to claim 11, wherein at least a portion of the liquid mixture removed from adjacent said second side in step (E) is transferred to a position opposite said first side.

13. Method according to claim 12, wherein steps (A), (B), (C), (D) and (E) are sequentially repeated in their entirety at least once and using another porous structure for each such repetition, and wherein the vapor mixture used in each repetition of step (A) consists of the vapor mixture removed during the immediately preceding performance of step (D).

* * * * *